United States Patent

Fujii et al.

(10) Patent No.: US 9,755,542 B2
(45) Date of Patent: Sep. 5, 2017

(54) DIRECT-CURRENT POWER TRANSMISSION POWER CONVERSION DEVICE AND DIRECT-CURRENT POWER TRANSMISSION POWER CONVERSION METHOD

(71) Applicants: MITSUBISHI ELECTRIC CORPORATION, Chiyoda-ku (JP); TOSHIBA MITSUBISHI-ELECTRIC INDUSTRIAL SYSTEMS CORPORATION, Chuo-Ku (JP)

(72) Inventors: Toshiyuki Fujii, Chiyoda-ku (JP); Kaho Mukunoki, Chiyoda-ku (JP); Osamu Mori, Chiyoda-ku (JP); Shinzo Tamai, Chuo-Ku (JP); Sadao Funahashi, Chuo-Ku (JP); Yasuhiko Hosokawa, Chuo-Ku (JP); Kotaro Higashi, Chuo-Ku (JP)

(73) Assignees: Mitsubishi Electric Corporation, Chiyoda-ku (JP); TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 15/305,586

(22) PCT Filed: May 19, 2015

(86) PCT No.: PCT/JP2015/064327
§ 371 (c)(1),
(2) Date: Oct. 20, 2016

(87) PCT Pub. No.: WO2015/178376
PCT Pub. Date: Nov. 26, 2015

(65) Prior Publication Data
US 2017/0047860 A1    Feb. 16, 2017

(30) Foreign Application Priority Data

May 21, 2014 (JP) .................................. 2014-104869

(51) Int. Cl.
H02M 7/00    (2006.01)
H02M 7/217   (2006.01)
H02M 7/483   (2007.01)

(52) U.S. Cl.
CPC ......... *H02M 7/2173* (2013.01); *H02M 7/483* (2013.01); *H02M 2007/4835* (2013.01)

(58) Field of Classification Search
CPC ......... H02M 2007/4835; H02M 7/483; H02M 5/458; H02M 7/2173
See application file for complete search history.

(56) References Cited

U.S. PATENT DOCUMENTS 4,941,079 A * 7/1990 Ooi ........................... H02J 3/36
                                                          363/132
2008/0013351 A1* 1/2008 Alexander .......... H02M 3/1582
                                                          363/123
(Continued)

FOREIGN PATENT DOCUMENTS

JP       2635660 B2      7/1997
JP    2011-182517 A      9/2011
(Continued)

OTHER PUBLICATIONS

International Search Report issued Aug. 25, 2015 in PCT/JP2015/064327 filed May 19, 2015.
(Continued)

*Primary Examiner* — Adolf Berhane
*Assistant Examiner* — Henry Lee, III
(74) *Attorney, Agent, or Firm* — Oblon, McClelland, Maier & Neustadt, L.L.P.

(57) ABSTRACT

In a power converter which performs power conversion between plural-phase AC and DC, variation in voltage of the (Continued)

DC capacitor in each converter cell is detected, and when the variation exceeds a predetermined value, a DC voltage command value as a control target value in a DC voltage control unit which controls DC voltage between DC buses is corrected by being increased or decreased. Thus, when AC grid failure occurs, the capacitor voltage of each converter cell is maintained and the operation continuity is improved.

13 Claims, 6 Drawing Sheets

(56) References Cited

U.S. PATENT DOCUMENTS

| | | | | |
|---|---|---|---|---|
| 2010/0014323 | A1* | 1/2010 | Sato | H02M 5/458 363/17 |
| 2010/0308649 | A1* | 12/2010 | Kono | B60L 9/005 307/9.1 |
| 2012/0170338 | A1* | 7/2012 | Trainer | H02M 7/483 363/127 |
| 2016/0056727 | A1* | 2/2016 | Mukunoki | H02M 7/483 363/68 |
| 2016/0329831 | A1 | 11/2016 | Mukunoki et al. | |

FOREIGN PATENT DOCUMENTS

| | | |
|---|---|---|
| WO | WO 2014/162620 A1 | 10/2014 |
| WO | WO 2015/104922 A1 | 7/2015 |

OTHER PUBLICATIONS

Makoto Hagiwara, et al., "Theoretical Analysis and Control of the Modular Multilevel Cascade Converter Based on Double-Star Chopper-Cells (MMCC-DSCC)" IEEJ Trans. IA, vol. 131, No. 1, 2011, 10 Pages (with English Abstract and Extended Summary).

* cited by examiner

DIRECT-CURRENT POWER TRANSMISSION POWER CONVERSION DEVICE AND DIRECT-CURRENT POWER TRANSMISSION POWER CONVERSION METHOD

TECHNICAL FIELD

The present invention relates to a DC power transmission power conversion device and a DC power transmission power conversion method that use a large-capacity power converter for performing power conversion between plural-phase AC and DC, and particularly, to operation continuation control when AC voltage is reduced.

BACKGROUND ART

In a large-capacity power converter, the converter output is high voltage or large current, and therefore, such a large-capacity power converter is often configured with a plurality of converters multiplexed in series or parallel. Multiplexing converters can not only increase the converter capacity, but also reduce harmonics contained in an output voltage waveform by synthesizing outputs, and as a result, can reduce harmonic current flowing to a grid.

As means for multiplexing converters, there is a multi-level converter in which outputs of a plurality of converters are connected in cascade, and one of such multilevel converters is a modular multilevel converter. Each arm of the modular multilevel converter is composed of a plurality of converter cells connected in cascade.

Each of a first arm and a second arm for each phase of the conventional modular multilevel converter has a chopper cell (converter cell) and a reactor. The chopper cell has two semiconductor switches connected in series to each other, and a DC capacitor connected in parallel thereto. In each of the first arm and the second arm, the same number of chopper cells are connected in cascade via their respective output ends.

In the case of controlling each phase of the conventional modular multilevel converter, if the capacitor voltage of each DC capacitor cannot be kept constant, overvoltage or low voltage occurs on the capacitor voltage, resulting in a failure in which the device is stopped. Therefore, the following controls and the like are performed: average value control for causing the average value of voltage values of all DC capacitors for each phase to follow a capacitor voltage command value; individual balance control for causing the voltage value of each DC capacitor to follow the capacitor voltage command value; and arm balance control for causing the average value of voltage values of all the DC capacitors in the first arm and the average value of voltage values of all the DC capacitors in the second arm to coincide with each other.

Circulating current which circulates among the phases in the modular multilevel converter without flowing to the outside of the modular multilevel converter is controlled, a voltage command value is calculated so as to control AC current for each phase, and a DC voltage command value is calculated so as to control DC output terminal voltage (for example, see Patent Document 1 and Non-Patent Document 1 below).

In a conventional DC power transmission power conversion device, a plurality of power converters are DC-interconnected so as to perform transmission and reception of active power between different AC grids, and active power control and DC voltage control are performed for each power converter (hereinafter, may be referred to as an AC-DC conversion terminal), thereby adjusting AC active power. At this time, the minimum value in the active power control and the DC voltage control is selected, and one DC voltage command is set to be equal to or smaller than those for the other AC-DC conversion terminals.

As the characteristics of the AC-DC conversion terminal, when the DC voltage decreases, output of the DC voltage control increases and output of the active power control is selected. Thus, control is performed at the DC voltage level based on the AC-DC conversion terminal for which the voltage command is small, and the other AC-DC conversion terminals perform active power control operations. If AC grid failure occurs on the AC-DC conversion terminal for which voltage control is being performed, and power balance is lost, the DC voltage increases and the DC voltage control outputs of the other AC-DC conversion terminals decrease. Thus, the control switches to DC voltage control to continue the operation (for example, see Patent Document 2 below).

CITATION LIST

Patent Document

Patent Document 1: Japanese Laid-Open Patent Publication No. 2011-182517
Patent Document 2: Japanese Patent No. 2635660

Non-Patent Document

Non-Patent Document 1: IEEJ transactions D (on industry applications) Vol. 131, No. 1, 2011 (pp. 84-92)

SUMMARY OF THE INVENTION

Problems to be Solved by the Invention

In such a DC power transmission power conversion device, in the case where a modular multilevel converter is configured as an AC-DC conversion terminal, if AC grid failure occurs and DC voltage and active power are controlled in each AC-DC conversion terminal, AC active power cannot be freely controlled in the AC-DC conversion terminal on which AC grid failure occurs. As a result, mainly, on the AC-DC conversion terminal side on which AC grid failure occurs, capacitor voltage of the DC capacitor cannot be kept constant, and overvoltage or low voltage occurs on the capacitor voltage, resulting in a problem that the device is stopped.

The present invention has been made to solve the above problems, and an object of the present invention is to obtain a DC power transmission power conversion device and a DC power transmission power conversion method that enable stable control of capacitor voltage, thereby enabling the operation to be continued.

Solution to the Problems

A DC power transmission power conversion device according to the present invention includes: a power converter including a plurality of leg circuits composed of a positive arm and a negative arm for each phase which are connected in series to each other and have a connection point therebetween connected to an AC line for a corresponding phase, the leg circuits being connected in parallel between positive and negative DC buses, the power converter performing power conversion between plural-phase AC and DC; and a control device for controlling the power converter. Each of the positive arm and the negative arm composing each leg circuit is composed of at least one converter cell connected in series. The converter cell is composed of a series unit of a plurality of semiconductor switching elements connected in series, and a DC capacitor connected in parallel to the series unit.

The control device performs output control for each converter cell composing the positive arm and the negative arm.

The control device includes:

a capacitor voltage control unit for generating a current command value (ipref, ip$^+$ref, ip$^-$ref) for voltage control for each DC capacitor on the basis of voltage (Vcap) of the DC capacitor;

a current control unit for, on the basis of the current command value (ipref, ip$^+$ref, ip$^-$ref) from the capacitor voltage control unit, generating a voltage command (Vpc$^+$, Vpc$^-$) for AC current control, of a positive arm voltage command (Vp$^+$) for controlling current flowing through the positive arm and a negative arm voltage command (Vp$^-$) for controlling current flowing through the negative arm; and a DC control unit for, on the basis of DC voltage (Vdc) between the DC buses, DC current (idc) flowing through the DC buses, and a command value (Vdcref, idcref) as a preset control target value, generating a DC voltage command (Vac*) for DC voltage control, of the positive arm voltage command (Vp$^+$) and the negative arm voltage command (Vp$^-$).

The control device corrects the command value (Vdcref or idcref) to be given to the DC control unit, in accordance with a detected amount of voltage variation in each DC capacitor.

In a DC power transmission power conversion method according to the present invention, a power converter is provided which includes a plurality of leg circuits composed of a positive arm and a negative arm for each phase which are connected in series to each other and have a connection point therebetween connected to an AC line for a corresponding phase, the leg circuits being connected in parallel between positive and negative DC buses, the power converter performing power conversion between plural-phase AC and DC, and a control device for controlling the power converter is provided. Each of the positive arm and the negative arm composing each leg circuit is composed of at least one converter cell connected in series. The converter cell is composed of a series unit of a plurality of semiconductor switching elements connected in series, and a DC capacitor connected in parallel to the series unit.

In this method, when performing output control for each converter cell composing the positive arm and the negative arm, the control device generates a current command value (ipref, ip$^+$ref, ip$^-$ref) for voltage control for each DC capacitor on the basis of voltage (Vcap) of the DC capacitor, on the basis of the current command value (ipref, ip$^+$ref, ip$^-$ref), generates a voltage command (Vpc$^+$, Vpc$^-$) for AC current control, of a positive arm voltage command (Vp$^+$) for controlling current flowing through the positive arm and a negative arm voltage command (Vp$^-$) for controlling current flowing through the negative arm, on the basis of DC voltage (Vdc) between the DC buses, DC current (idc) flowing through the DC buses, and a command value (Vdcref, idcref) as a preset control target value, generates a DC voltage command (Vdc*) for DC voltage control, of the positive arm voltage command (Vp$^+$) and the negative arm voltage command (Vp$^-$), and corrects the command value (Vdcref or idcref) in accordance with a detected amount of voltage variation in each DC capacitor.

Effect of the Invention

According to the present invention, voltage variation in the DC capacitor is detected, and when the variation exceeds a predetermined value, the DC voltage command value is increased or decreased. Thus, even when AC grid failure occurs, excessive flow of energy from and to the DC capacitor can be prevented, whereby sharp voltage variation in the DC capacitor is suppressed and the operation can be continued. As a result, an effect of improving the operation continuation performance is provided.

DESCRIPTION OF EMBODIMENTS

Embodiment 1

Figure 1:
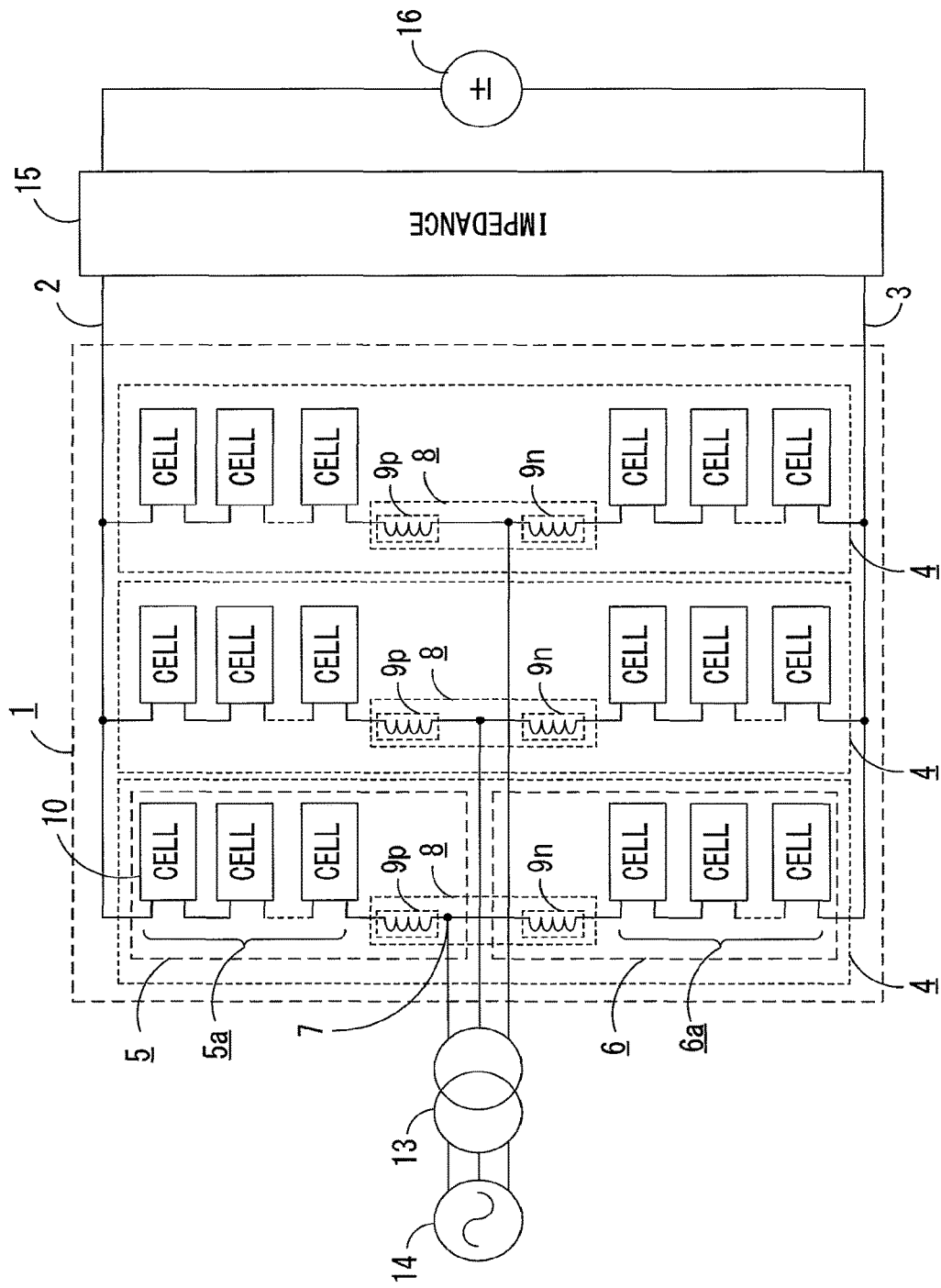
FIG. 1 FIG. 1 is a configuration diagram of a DC power transmission power conversion device according to embodiment 1 of the present invention.

FIG. 1 is a schematic configuration diagram of a DC power transmission power conversion device according to embodiment 1 of the present invention.

The DC power transmission power conversion device of embodiment 1 includes a power converter 1 as a main circuit, and a control device 20 described later for controlling the power converter 1.

The power converter 1 performs power conversion between plural-phase AC (here, particularly, three-phase AC) and DC. The AC side of the power converter 1 is connected via an interconnection transformer 13 to an AC power supply 14 which is an AC grid, and the DC side is connected via an impedance 15 to a DC power supply 16. As the DC power supply 16 in this case, another power conversion device for performing DC output is applied. The connection to the AC power supply 14 may be made via an interconnection reactor instead of using the interconnection transformer 13 shown in FIG. 1.

In each phase of the power converter 1, a positive arm 5 and a negative arm 6 are connected in series. An AC end 7 which is the connection point between the positive arm 5 and the negative arm 6 is connected to an AC line for each phase, thus forming a leg circuit 4. The leg circuits 4 for three phases are connected in parallel between positive and negative DC buses 2 and 3.

The positive arm 5 and the negative arm 6 composing each leg circuit 4 have cell groups 5a and 6a each including a plurality of converter cells 10 connected in series. A positive reactor 9p and a negative reactor 9n are each provided in series between the respective cell groups 5a and 6a and the AC end 7. In this case, the positive reactor 9p, the negative reactor 9n, and the AC end 7 form a reactor 8 having three terminals.

The locations where the positive reactor 9p and the negative reactor 9n are provided may be any locations in the arms 5 and 6, and a plurality of each reactor may be provided. Their reactor values may be different from each other, or in an extreme case, reactors may be provided only on the positive side or the negative side.

Instead of providing the positive reactor 9p and the negative reactor 9n between the cell groups 5a and 6a and the AC end 7, the following configuration may be employed: a transformer is individually provided to each cell group 5a, 6a, the cell groups 5a and 6a are connected in series to each other via primary windings of the transformers, secondary windings of the transformers are connected to each other, and one end of the connected secondary windings is connected to the AC end 7 (see Japanese Laid-Open Patent Publication No. 2013-115837).

Figure 2:
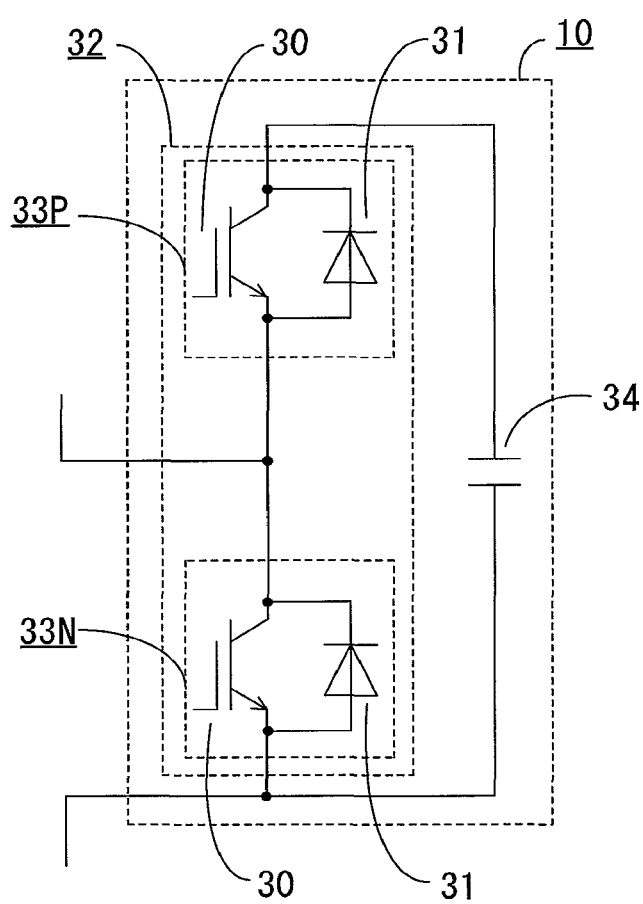
FIG. 2 FIG. 2 is a circuit diagram showing the configuration of a converter cell of the DC power transmission power conversion device according to embodiment 1 of the present invention.

FIG. 2 shows a configuration example of each converter cell 10.

The converter cell 10 shown in FIG. 2 is a converter cell 10 in which a half-bridge configuration is employed. The converter cell 10 is composed of: a series unit 32 of a plurality of (in this case, two) semiconductor switching elements 30 (hereinafter, simply referred to as switching elements) to which diodes 31 are respectively connected in antiparallel; and a DC capacitor 34 connected in parallel to the series unit 32 and for smoothing DC voltage.

Each switching element 30 is formed of a self-turn-off switching element such as an IGBT (Insulated Gate Bipolar Transistor) or a GCT (Gate Commutated Turn-off thyristor), and the diodes 31 are respectively connected in antiparallel thereto, to form switches 33P and 33N.

As shown in FIG. 2, in the converter cell 10, both terminals of the switching element 30 of the switch 33N are used as output ends, and through ON/OFF control of the switching elements 30 of the respective switches 33N and 33P, both-end voltage of the DC capacitor 34 and zero voltage are outputted from the output ends.

Figure 3:
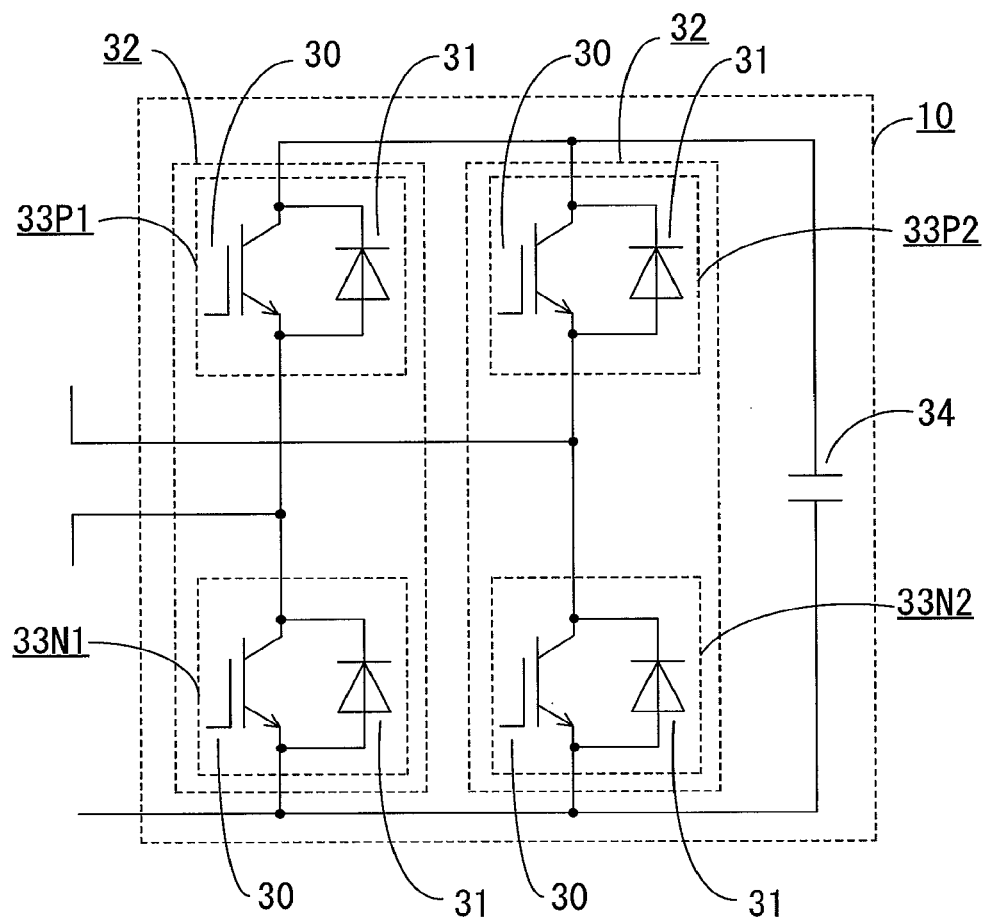
FIG. 3 FIG. 3 is a circuit diagram showing another configuration example of the converter cell of the DC power transmission power conversion device according to embodiment 1 of the present invention.

FIG. 3 shows another configuration example of each converter cell 10.

The converter cell 10 shown in FIG. 3 is a converter cell 10 in which a full-bridge configuration is employed. The converter cell 10 is composed of: two series units 32 connected in parallel; and a DC capacitor 34 connected in parallel to the series units 32 and for smoothing DC voltage. Each series unit 32 is composed of a plurality of (in this case, two) switching elements 30 connected in series, to which diodes 31 are respectively connected in antiparallel. Each switching element 30 is formed of a self-turn-off switching element such as an IGBT or a GCT, and the diodes 31 are respectively connected in antiparallel thereto, to form switches 33P1, 33P2, 33N1, and 33N2.

As shown in FIG. 3, in the converter cell 10, terminals of the switching elements 30 corresponding to the intermediate connection points of the respective series units 32 are used as output ends, and through ON/OFF control of the switching elements 30, positive voltage and negative voltage at both ends of the DC capacitor 34 and zero voltage are outputted from the output ends.

The converter cell 10 is not limited to the configurations shown in FIG. 2 and FIG. 3 as long as the converter cell 10 is composed of a series unit 32 of a plurality of switching elements 30, and a DC capacitor 34 connected in parallel to the series unit 32, and selectively outputs voltage of the DC capacitor 34 through switching operation.

Figure 4:
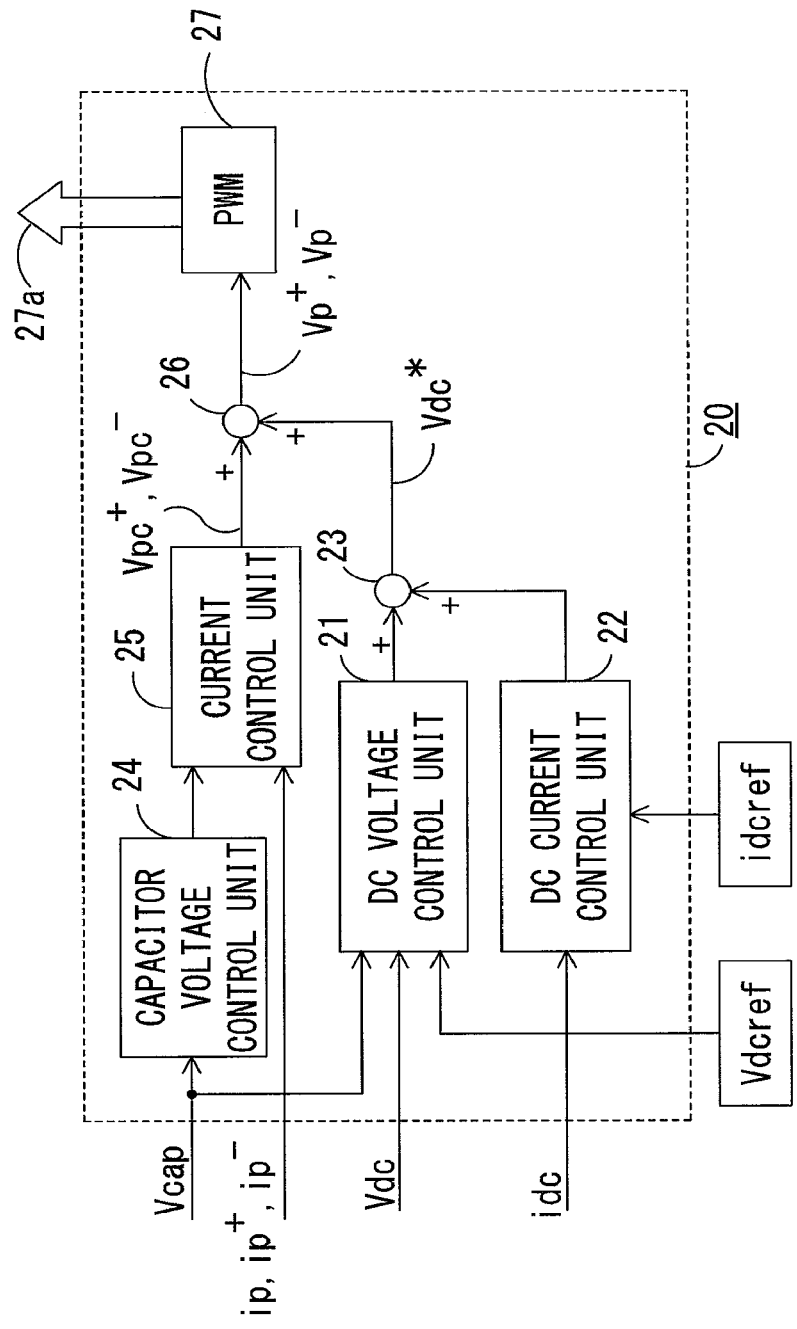
FIG. 4 FIG. 4 is a block diagram showing a configuration example of a control device of a DC power transmission power conversion device according to embodiment 1 of the present invention.

FIG. 4 is a block diagram showing a configuration example of the control device of the DC power transmission power conversion device according to embodiment 1 of the present invention.

Positive arm current $ip^+$ and negative arm current $ip^-$ flowing through the positive arm 5 and the negative arm 6 for each phase, AC current ip flowing through an AC line for each phase, DC voltage Vdc between the DC buses 2 and 3, DC current idc flowing through the DC buses 2 and 3, capacitor voltage Vcap applied to the DC capacitor 34 in each converter cell 10, are detected by respective detectors (not shown) and then inputted to the control device 20.

As the DC current idc, the one calculated from the currents $ip^+$ and $ip^-$ flowing through the positive arm 5 and the negative arm 6 for each phase may be used. Similarly, as the AC current ip for each phase, the one calculated from the currents $ip^+$ and $ip^-$ flowing through the positive arm 5 and the negative arm 6 for each phase may be used.

Schematically, in the control device 20, outputs of a DC voltage control unit 21, a DC current control unit 22, and a current control unit 25 are added by adders 23 and 26, thereby generating a positive arm voltage command $Vp^+$ for controlling current flowing through the positive arm 5, and a negative arm voltage command $Vp^-$ for controlling current flowing through the negative arm 6. Then, in the control device 20, a PWM control unit 27 at the next stage generates a gate signal 27a on the basis of the positive arm voltage command $Vp^+$ and the negative arm voltage command $Vp^-$, and the operation of each converter cell 10 in the positive arm 5 and the negative arm 6 for each phase is controlled by the gate signal 27a.

Specifically, in order to control capacitor voltage Vcap of the DC capacitor 34 in each converter cell 10, a capacitor voltage control unit 24 generates, for each phase, an active current command value ipref, a positive arm current command value $ip^+$ref, and a negative arm current command value $ip^-$ref for voltage control for the DC capacitor 34 on the basis of the detected capacitor voltages Vcap of all the converter cells 10 for each phase.

The current control unit 25 generates, for each phase, voltage commands $Vpc^+$ and $Vpc^-$ for controlling AC currents flowing through the positive arm 5 and the negative arm 6 for each phase, on the basis of information about the current command values (active current command value ipref, positive arm current command value $ip^+$ref, negative arm current command value $ip^-$ref) given from the capacitor voltage control unit 24, and the positive arm current $ip^+$ and the negative arm current $ip^-$ detected for each phase and the detected AC current ip for each phase. That is, of the arm voltage commands $Vp^+$ and $Vp^-$ given to the PWM control unit 27, the voltage commands $Vpc^+$ and $Vpc^-$ for controlling AC currents flowing through the positive arm 5 and the negative arm 6 for each phase are generated for each phase.

The DC voltage control unit 21 generates and outputs a main component of a DC voltage command Vdc* for DC voltage control on the basis of the detected DC voltage Vdc between the DC buses 2 and 3, the capacitor voltages Vcap of all the converter cells 10 for each phase, and a DC voltage command value Vdcref as a control target value for DC voltage given from a superior control device (not shown).

The DC current control unit 22 generates and outputs a partial component (impedance component on DC line) of the DC voltage command Vdc* for DC voltage control on the basis of the detected DC current idc and a DC current command value idcref as a control target value for DC current given from a superior control device (not shown).

The outputs of the DC voltage control unit 21 and the DC current control unit 22 are added by the adder 23, thereby generating the DC voltage command Vdc* for DC voltage control. Next, the voltage commands $Vpc^+$ and $Vpc^-$ for AC current control for the positive arm 5 and the negative arm 6 for each phase, outputted from the current control unit 25, and the DC voltage command Vdc* obtained by the adder 23, are added by the adder 26, thereby obtaining the positive arm voltage command $Vp^+$ and the negative arm voltage command $Vp^-$. The PWM control unit 27 generates the gate signal 27a through pulse width modulation control (PWM control) on the basis of the voltage commands $Vp^+$ and $Vp^-$, thereby controlling the operation of each converter cell 10.

The DC voltage control unit 21, the DC current control unit 22, and the adder 23 correspond to a DC control unit in claims.

Next, the details of the control operation of the control device 20 according to the present embodiment 1 will be described below.

Voltage outputted from the cell group 5a in the positive arm 5 and voltage outputted from the cell group 6a in the negative arm 6 include an AC voltage component applied to the AC end 7 of the interconnection transformer 13, a DC voltage component outputted between the DC buses 2 and 3, and a voltage component applied to the positive reactor 9p and the negative reactor 9n.

A composite voltage ΣVcap obtained by combining (adding or averaging) the capacitor voltages Vcap of all the converter cells 10 composing the power converter 1 is controlled by the operation in which the difference voltage between active power flowing from the AC power supply 14 and DC power flowing to the DC power supply 16 is converted to DC current flowing to the DC capacitor 34 through switching of each converter cell 10, and the DC capacitor 34 in each converter cell 10 is charged and discharged. Therefore, the composite voltage ΣVcap can be controlled by controlling active current flowing through the AC power supply 14.

The composite voltage ΣVcap can be controlled through power interchange among the leg circuits 4 for the respective phases. That is, for example, so-called circulating current is caused to flow among the leg circuits 4 for the respective phases to interchange power, whereby imbalance among the phases can be eliminated.

On the basis of the above principle, in order to control the capacitor voltage Vcap of the DC capacitor 34 in each converter cell 10, the capacitor voltage control unit 24 generates and outputs the active current command value ipref for controlling active current flowing through the AC power supply 14, and the positive arm current command value $ip^+ref$ and the negative arm current command value $ip^-ref$ for voltage control for the positive arm 5 and the negative arm 6, on the basis of information about the detected capacitor voltage Vcap of each converter cell 10 in each positive arm 5 and each negative arm 6.

The current control unit 25 controls AC voltage components of voltages outputted from the cell groups 5a and 6a, and voltages applied to the reactors 9p and 9n provided in the positive and negative arms 5 and 6. That is, the current control unit 25 performs feedback control so that the AC current ip for each phase and the detected positive arm current $ip^+$ and negative arm current $ip^-$ for each phase coincide with the respective current command values (active current command value ipref, positive arm current command value $ip^+ref$, negative arm current command value $ip^-ref$) given from the capacitor voltage control unit 24, thereby generating, for each phase, the voltage commands $Vpc^+$ and $Vpc^-$ for controlling AC current flowing through the positive arm 5 and the negative arm 6 for each phase.

The DC voltage control unit 21 performs feedback control so that the detected DC voltage Vdc between the DC buses 2 and 3 coincides with the DC voltage command value Vdcref as a control target value for DC voltage, thereby generating and outputting a main component of the DC voltage command Vdc* for DC voltage control.

The DC current idc flows when difference voltage between voltage between the DC buses 2 and 3 and voltage of the DC power supply 16 is applied to the impedance 15. On the basis of this principle, the DC current control unit 22 performs feedback control so that the detected DC current idc coincides with the DC current command value idcref as a control target value for DC current, thereby generating a partial component (impedance component on DC line) of the DC voltage command Vdc* for controlling DC voltage between the DC buses 2 and 3. The outputs of the DC voltage control unit 21 and the DC current control unit 22 are added by the adder 23, thereby calculating the DC voltage command Vdc* for DC voltage control.

Next, the adder 26 at the next stage adds the voltage commands $Vpc^+$ and Vpc for AC current control for the positive arm 5 and the negative arm 6 for each phase outputted from the current control unit 25, and the DC voltage command Vdc* for DC voltage control outputted from the adder 23, thereby calculating the positive arm voltage command $Vp^+$ and the negative arm voltage command $Vp^-$. The PWM control unit 27 generates the gate signal 27a through pulse width modulation control (PWM control) on the basis of the voltage commands $Vp^+$ and $Vp^-$.

In the case where a plurality of power converters 1 are DC-interconnected so as to perform transmission and reception of active power between different AC grids, each DC power supply 16 becomes another AC-DC conversion terminal (hereinafter, referred to as a second AC-DC conversion terminal). Here, for example, in the case where the DC power supply 16 as a second AC-DC conversion terminal is provided with the power converter 1 and the control device 20, when the control device 20 as the second AC-DC conversion terminal limits output of the DC current control unit 22 to zero and the DC voltage Vdc between the DC buses 2 and 3 is controlled in accordance with output of the DC voltage control unit 21, the DC power supply 16 as the second AC-DC conversion terminal becomes equivalent to a DC voltage source.

In this case, since the control device 20 for the power converter 1 shown in FIG. 4 limits output of the DC current control unit 22 to zero and controls the DC voltage Vdc between the DC buses 2 and 3 in accordance with output of the DC voltage control unit 21, the power converter 1 shown in FIG. 1 performs operation equivalent to a DC voltage source.

On the other hand, in the case where the DC current control unit 22 of the control device 20 for the DC power supply 16 as the second AC-DC conversion terminal performs operation equivalent to a current source, the control device 20 for the power converter 1 shown in FIG. 4 limits output of the DC voltage control unit 21 to zero and controls the DC voltage Vdc between the DC buses 2 and 3 in accordance with output of the DC current control unit 22, thereby performing operation equivalent to a current source, for a DC circuit composed of the impedance 15 and the DC power supply 16.

Thus, in the case where a plurality of power converters 1 are DC-interconnected, there is at least one AC-DC conversion terminal for controlling the DC voltage Vdc, and the other AC-DC conversion terminals are to control the DC currents idc.

In the case where the control device 20 for the power converter 1 limits output of the DC current control unit 22 to zero and performs control in accordance with output of the DC voltage control unit 21, that is, in the case where the power converter 1 shown in FIG. 1 performs operation equivalent to a DC voltage source, occurrence of grid failure (instantaneous voltage drop) in which the magnitude of AC voltage Vp reduces in the AC power supply 14 will be assumed. In this case, AC power reduces, whereby balance between AC power and DC power is lost, and difference power occurs. In accordance with occurrence of the difference power, the DC capacitor 34 in each converter cell 10 is to be charged and discharged.

In this case, in the DC voltage control unit 21, on the basis of information about the detected capacitor voltage Vcap of each DC capacitor 34, when the magnitude of the composite voltage ΣVcap obtained by combining (adding or averaging) the capacitor voltages Vcap of all the converter cells 10 for each phase exceeds a first predetermined value ΔVmax set in advance or becomes smaller than a second predetermined value ΔVmin (<ΔVmax) set in advance, the DC voltage command value Vdcref is increased or decreased by a fixed value ΔVdcref set in advance, in accordance with the direction of the DC current idc or the DC current command value idcref therefor.

In this case, the first predetermined value ΔVmax is set to be equal to or lower than the overvoltage level of capacitor voltage Vcap, at which failure of the converter cell 10 is detected. Preferably, the second predetermined value ΔVmin is set to be equal to or higher than the low voltage level of the capacitor voltage Vcap, at which failure of the converter cell 10 is detected. Desirably, the fixed value ΔVdcref is set in accordance with the magnitude of a resistance component of the impedance 15.

Thus, in the case where the magnitude of the composite voltage ΣVcap exceeds the first predetermined value ΔVmax set in advance and the DC current idc flows from the power converter 1 to the DC power supply 16, the DC voltage command value Vdcref is decreased to reduce the amount of the DC current idc flowing out from the power converter 1. On the other hand, in the case where the magnitude of the composite voltage ΣVcap is lower than the second predetermined value ΔVmin set in advance and the DC current idc flows from the DC power supply 16 to the power converter 1, the DC voltage command value Vdcref is increased to reduce the amount of the DC current idc flowing into the power converter 1.

By this control, the magnitude of the DC current idc is decreased, thereby decreasing the magnitude of DC power. Thus, it is possible to suppress variation in the capacitor voltage Vcap due to charge and discharge of the DC capacitor 34 in each converter cell 10 according to AC power reduction caused by voltage reduction in the AC power supply 14 when grid failure (instantaneous voltage drop) or the like occurs.

That is, when voltage of the AC power supply 14 reduces, even if AC power that can be transmitted and received decreases due to constraint of the current capacity of the power converter 1, by decreasing the magnitude of the DC current idc, the magnitude of DC power is decreased, so that the active current command value ipref outputted from the capacitor voltage control unit 24 is kept within the constraint, whereby AC power and DC power can be balanced.

In the case where the magnitude of the composite voltage ΣVcap obtained by combining (adding or averaging) the capacitor voltages Vcap of all the converter cells 10 is between the first predetermined value ΔVmax and the second predetermined value ΔVmin, variation in the capacitor voltage Vcap due to charge or discharge of the DC capacitor 34 in each converter cell 10 is being suppressed. Therefore, there is no direct relation with elimination of AC grid failure, and processing of increasing or decreasing the DC voltage command value Vdcref by the fixed value ΔVdcref is stopped, to return the DC voltage command value Vdcref to its original value.

In this stop operation, it is desirable that return from the value of Vdcref±ΔVdcref to Vdcref is performed through gradual change with elapse of time. Thus, when the AC grid has failed, variation in the capacitor voltage Vcap can be suppressed and overvoltage or low voltage can be prevented from being detected on the capacitor voltage Vcap, whereby the operation can be continued.

In output limitation in the DC current control unit 22 of the control device 20, it is desirable to limit the output to a value greater than DC voltage caused due to the magnitude of a resistance component of the impedance 15 but smaller than change in DC voltage controlled by the DC voltage command value ΔVdcref.

As described above, in the present embodiment 1, when, for example, grid failure (instantaneous voltage drop) in which the magnitude of AC voltage Vp reduces occurs on the AC power supply 14, and the capacitor voltage Vcap of each converter cell 10 varies, the DC voltage command value Vdcref for the DC voltage control unit 21 is controlled in accordance with the variation in the capacitor voltage Vcap, to adjust the magnitude of DC power, whereby AC power and DC power can be balanced even when AC power reduces due to voltage reduction in the AC power supply 14. Thus, it becomes possible to continue the operation by suppressing variation in the capacitor voltage Vcap of each converter cell 10 through operation of the capacitor voltage control unit 24 without detecting the failure.

Embodiment 2

Figure 5:
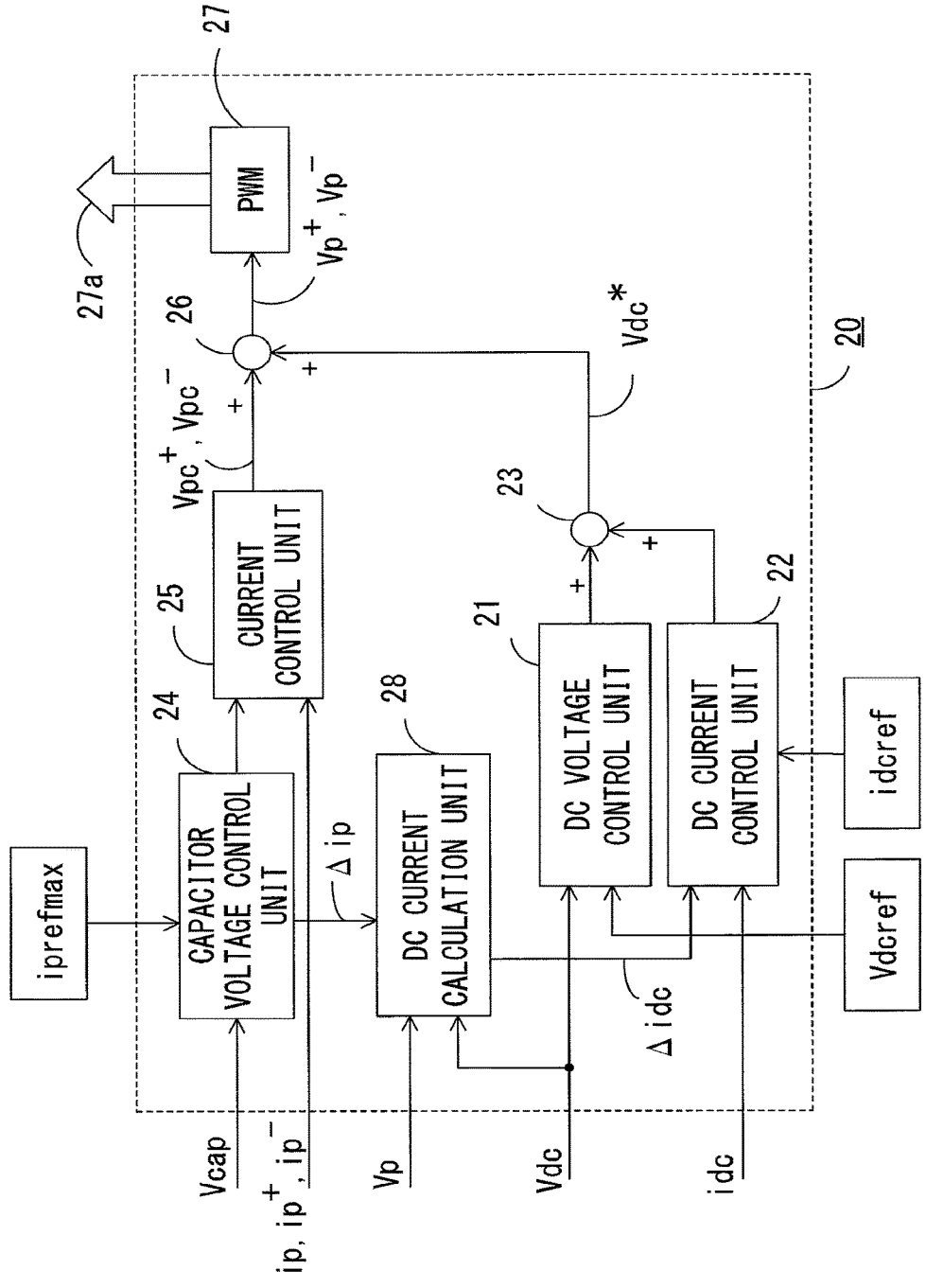
FIG. 5 FIG. 5 is a block diagram showing a configuration example of a control device of a DC power transmission power conversion device according to embodiment 2 of the present invention.

FIG. 5 is a block diagram showing a configuration example of a control device of a DC power transmission power conversion device according to embodiment 2 of the present invention.

In the present embodiment 2, the configuration of the power converter 1 is the same as that in the above embodiment 1 shown in FIG. 1, but the configuration of the control device 20 is different from that in the above embodiment 1.

In the present embodiment 2, as in embodiment 1, in order to control the capacitor voltage Vcap of each converter cell 10, on the basis of information about the detected capacitor voltages Vcap of all the converter cells 10 for each phase, the capacitor voltage control unit 24 generates current command values (active current command value ipref, positive arm current command value ip$^+$ref, negative arm current command value ip$^-$ref) and gives them to the current control unit 25.

Particularly, the active current command value ipref outputted from the capacitor voltage control unit 24 is to adjust the active current flowing through the AC power supply 14 in order to perform feedback control of the composite voltage ΣVcap of the capacitor voltages Vcap of all the converter cells 10 for each phase, and the active current command value ipref is constrained by the value of current that can flow in the power converter 1, i.e., the current capacity.

Therefore, for the active current command value ipref, a limiting value iprefmax is provided so that the active current command value ipref falls within a predetermined range (limiter function). In the present embodiment 2, the capacitor voltage control unit 24 calculates the deviation between before and after the limitation, as an active current excessive component Δip (=iprefmax−ipref), and outputs the active current excessive component Δip to a DC current calculation unit 28 described later.

As in embodiment 1, on the basis of information about the current command values (active current command value ipref, positive arm current command value ip$^+$ref, negative arm current command value ip$^-$ref) given from the capacitor voltage control unit 24, and the detected currents ip, ip$^+$, ip$^-$, the current control unit 25 generates, for each phase, the voltage commands Vpc$^+$ and Vpc$^-$ for controlling AC current flowing through the positive arm 5 and the negative arm 6, of the arm voltage commands Vp$^+$ and Vp$^-$.

On the basis of information about the active current excessive component Δip given from the capacitor voltage control unit 24, the detected DC voltage Vdc between the DC buses 2 and 3, and the AC voltage Vp for each phase detected on the AC power supply 14 side or the power converter 1 side of the interconnection transformer 13, the DC current calculation unit 28 calculates a DC current excessive component Δidc as a DC conversion value of the active current excessive component Δip, and outputs the DC current excessive component Δidc to the DC current control unit 22.

Unlike the case of embodiment 1, the DC voltage control unit 21 does not receive the detection output of the capacitor voltage Vcap of each converter cell 10, but receives only information about the DC voltage Vdc between the DC buses 2 and 3. Then, the DC voltage control unit 21 performs feedback control so that the DC voltage Vdc coincides with the DC voltage command value Vdcref as a control target value for DC voltage given from a superior control device (not shown), and generates and outputs a main component of the DC voltage command Vdc* for DC voltage control.

The DC current control unit 22 generates and outputs a partial component (impedance component on DC line) of the DC voltage command Vdc* for DC voltage control on the basis of information about the detected DC current idc, a DC current command value idcref as a control target value for DC current given from a superior control device (not shown), and the DC current excessive component Δidc given from the DC current calculation unit 28.

Hereafter, as in embodiment 1, the outputs of the DC voltage control unit 21 and the DC current control unit 22 are added by the adder 23, thereby generating the DC voltage command Vdc* for DC voltage control. Next, the voltage components Vdc$^+$ and Vpc$^-$ for AC current control for the positive arm 5 and the negative arm 6 for each phase, outputted from the current control unit 25, and the DC voltage command Vdc* obtained by the adder 23, are added by the adder 26, thereby obtaining the positive arm voltage command Vp$^+$ and the negative arm voltage command Vp$^-$. The PWM control unit 27 generates the gate signal 27a through pulse width modulation control (PWM control) on the basis of the voltage commands Vp$^+$ and Vp$^-$, thereby controlling the operation of each converter cell 10.

Next, the details of the control operation of the control device 20 according to the present embodiment 2 will be described below.

As previously described, for the active current command value ipref outputted from the capacitor voltage control unit 24, the limiting value iprefmax is provided so that the active current command value ipref falls within a predetermined range (limiter function). That is, in the feedback control of the composite voltage ΣVcap, a deviation between the composite voltage ΣVcap and a preset command value is amplified to obtain the active current command value ipref, and if the deviation is great, the active current command value ipref is limited by the limiting value iprefmax, whereby a deviation occurs between before and after the limitation.

When this deviation occurs, the composite voltage ΣVcap of the capacitor voltages Vcap of the converter cells 10 cannot be controlled, and therefore sufficient power necessary for maintaining the capacitor voltages Vcap cannot be obtained from the AC power supply 14. In order to prevent this, operation is performed so as to reduce DC power, i.e., decrease the magnitude of the DC current idc.

First, in the case where the active current command value ipref generated by the capacitor voltage control unit 24 exceeds the limiting value iprefmax, a deviation between before and after the limitation is outputted as the active current excessive component Δip (=iprefmax−ipref) to the DC current calculation unit 28.

The active power excessive amount Δip in this case may be calculated from a sum of products of the instantaneous-value voltage and current of the three-phase AC, or may be calculated by converting the three-phase AC into an orthogonal coordinate system and similarly calculating a sum of products of the voltage and current. In this case, it is desirable to provide a filter for removing frequencies that are contained in power P occurring in an unbalanced state or during transition and are two times and one time as high as the frequency of the AC power supply 14.

The DC current calculation unit 28 calculates an active power excessive amount ΔP on the basis of the active current excessive component Δip outputted from the capacitor voltage control unit 24 and the magnitude of the detected AC voltage Vp. Next, the DC current calculation unit 28 divides the active power excessive amount ΔP by the DC voltage Vdc, thereby calculating the DC current excessive component Δidc as a DC conversion value of the active current excessive component Δip. This calculation is derived from the condition that allows AC power and DC power to be balanced. The DC current excessive component Δidc calculated by the DC current calculation unit 28 is given to the DC current control unit 22.

Regarding the division of the active power excessive amount ΔP by the DC voltage Vdc, it is desirable to limit the value of the DC voltage Vdc before division to a predetermined value or greater in consideration of the operation range of the DC voltage Vdc, so as to prevent Δidc from being calculated as an excessive value by the division when voltage of the DC power supply 16 reduces or the DC buses 2 and 3 are short-circuited.

The DC current control unit 22 performs the following process on the basis of information about the DC current excessive component Δidc given from the DC current calculation unit 28, the detected DC current idc, and the DC current command value idcref as a control target value for DC current.

Here, in the case where the active current excessive component Δip has such a polarity that indicates power flowing from the AC power supply 14 to the power converter 1, that is, in the case where the DC current idc has such a polarity that indicates power flowing from the power converter 1 to the DC power supply 16, the DC current control unit 22 performs correction to subtract the DC current excessive component Δidc from the DC current command value idcref as a control target value for DC current.

In this case, power that should be caused to flow from the AC power supply 14 to the power converter 1 becomes insufficient due to limitation of the active current command value ipref. However, since the DC current command value idcref is decreased by the DC current excessive component Δidc, the power balance can be kept.

On the other hand, in the case where the active current excessive component Δip has such a polarity that indicates power flowing from the power converter 1 into the AC power supply 14, that is, in the case where the DC current idc has such a polarity that indicates power flowing from the DC power supply 16 to the power converter 1, the DC current control unit 22 performs correction to add the DC current excessive component Δidc to the DC current command value idcref as a control target value for DC current.

In this case, power that should be caused to flow from the power converter 1 to the AC power supply 14 becomes insufficient due to limitation of the active current command value ipref. However, since the DC current command value idcref is increased by the DC current excessive component Δidc, the power balance can be kept.

Regarding the correction of the DC current command value idcref by the DC current excessive component Δidc as described above, it is preferable to provide a dead zone with respect to the DC current excessive component Δidc so that operation is performed when the magnitude of the DC current excessive component Δidc becomes equal to or greater than the predetermined value.

Then, the DC current control unit 22 performs feedback control so that the detected DC current idc coincides with the corrected DC current command value (idcref−Δidc) or (idcref+Δidc), thereby generating and outputting a partial component of the DC voltage command Vdc* so as to control the DC voltage Vdc between the DC buses 2 and 3.

The DC voltage control unit 21 performs feedback control so that the DC voltage Vdc between the DC buses 2 and 3 coincides with the DC voltage command value Vdcref, thereby generating and outputting a partial component (impedance component on DC line) of the DC voltage command Vdc* for controlling the DC voltage Vdc between the DC buses 2 and 3.

Hereafter, as in embodiment 1, the adder 23 adds the output of the DC voltage control unit 21 and the output of the DC current control unit 22, thereby calculating the DC voltage command Vdc* for DC voltage control. Next, the adder 26 at the next stage adds: the voltage components $Vpc^+$ and $Vpc^-$ for AC current control for the positive arm 5 and the negative arm 6 for each phase, outputted from the current control unit 25; and the DC voltage command Vdc* for DC voltage control obtained by the adder 23, thereby calculating the positive arm voltage command $Vp^+$ and the negative arm voltage command $Vp^-$. Then, the PWM control unit 27 generates the gate signal 27a through pulse width modulation control (PWM control) on the basis of the voltage commands $Vp^+$ and $Vp^-$.

In the case where a plurality of power converters 1 are DC-interconnected so as to perform transmission and reception of active power between different AC grids, each DC power supply 16 becomes another AC-DC conversion terminal. In the DC-interconnected power converters 1, there is at least one AC-DC conversion terminal for controlling the DC voltage Vdc, and the other AC-DC conversion terminals are to control the DC currents idc. The details thereof have been already described in embodiment 1, so the detailed description is omitted here.

As described above, in the present embodiment 2, when the capacitor voltage control unit 24 performs feedback control of the composite voltage ΣVcap obtained by combining (adding or averaging) the capacitor voltages of all the converter cells 10, even if the active current command value ipref is limited by the limiter function, the DC current control unit 22 operates so as to correct the DC current command value idcref as a control target value for DC current by the DC current excessive component Δidc. Thus, balance between AC power and DC output can be kept, and the feedback control of the composite voltage ΣVcap is allowed to work.

Thus, when, for example, grid failure (instantaneous voltage drop) in which the magnitude of AC voltage reduces occurs on the AC power supply 14, and the capacitor voltage Vcap of each converter cell 10 varies, the feedback control of the composite voltage ΣVcap works in accordance with the variation in the capacitor voltage Vcap, whereby the capacitor voltage Vcap of the DC capacitor 34 in each converter cell 10 can be stably maintained, and even in the AC-DC conversion terminal that mainly controls the DC current, variation in the capacitor voltage Vcap of each converter cell 10 can be suppressed and the operation can be continued without detecting the failure.

Embodiment 3

Figure 6:
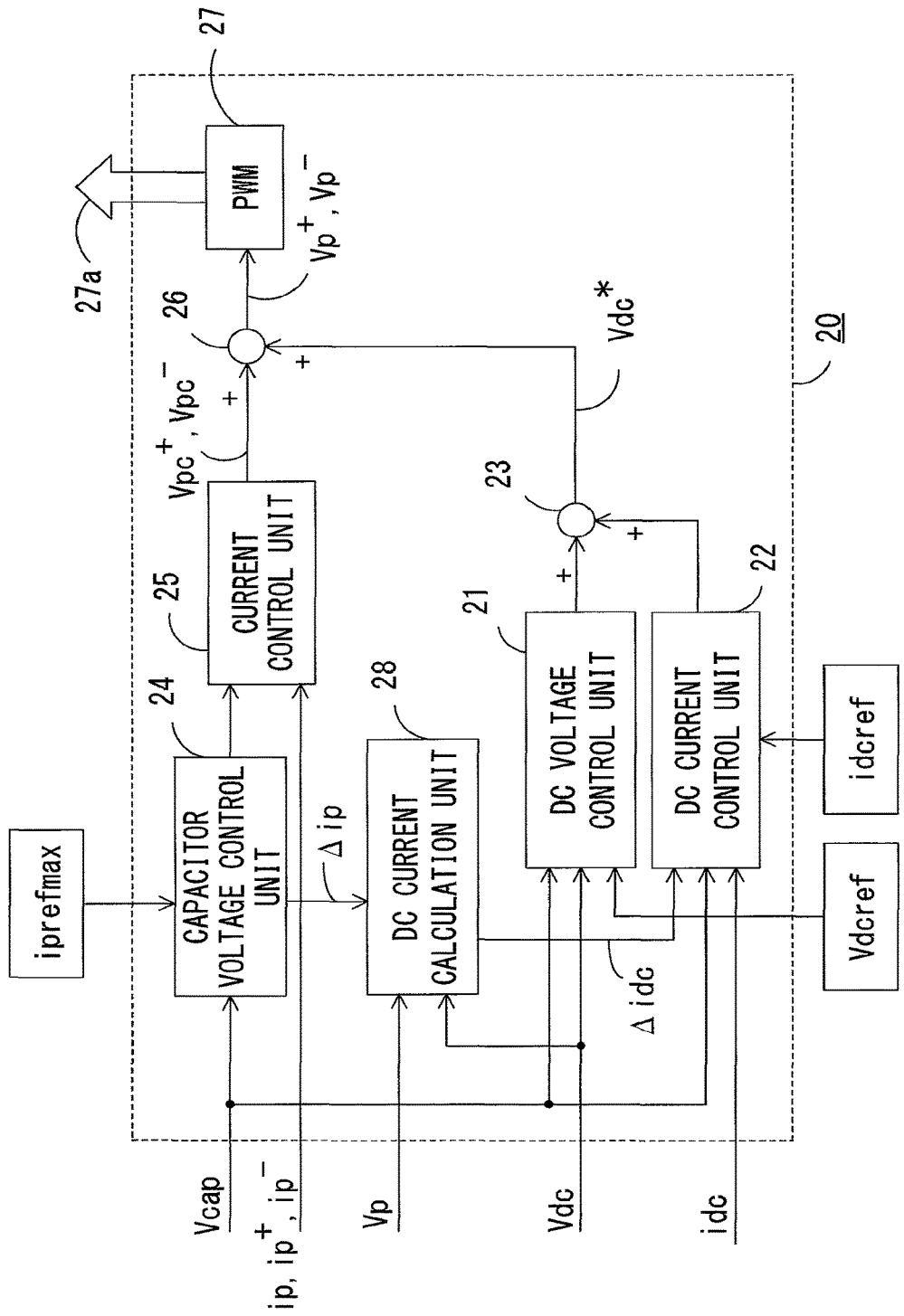
FIG. 6 FIG. 6 is a block diagram showing a configuration example of a control device of a DC power transmission power conversion device according to embodiment 3 of the present invention.

FIG. 6 is a block diagram showing a configuration example of a control device of a DC power transmission power conversion device according to embodiment 3 of the present invention.

In the present embodiment 3, the configuration of the power converter 1 is the same as that in the above embodiment 1 shown in FIG. 1, but the configuration of the control device 20 is slightly different from those in the above embodiments 1 and 2.

In the present embodiment 3, the configurations of the DC voltage control unit 21 and the current control unit 25 are the same as those in embodiment 1, and the configurations of the capacitor voltage control unit 24, the DC current calculation unit 28, the adders 23 and 26, and the PWM control unit 27 are the same as those in embodiment 2.

Unlike the case of embodiment 2, the DC current control unit 22, as well as receiving the detected DC current idc and the DC current excessive component Δidc calculated by the DC current calculation unit 28, receives the detected capacitor voltages Vcap of all the converter cells 10 for each phase. On the basis of the above information, the DC current control unit 22 outputs a partial component (impedance component on DC line) of the DC voltage command Vdc*.

Next, the details of control operation by the control device 20 according to the present embodiment 3 will be described below.

In the configuration in FIG. 6, in the case where the control device 20 for the power converter 1 limits output of the DC current control unit 22 to zero and performs control in accordance with output of the DC voltage control unit 21, that is, in the case where the power converter 1 configured as shown in FIG. 1 performs operation equivalent to a DC voltage source, if grid failure (instantaneous voltage drop) in which the magnitude of AC voltage reduces occurs on the AC power supply 14, AC power reduces, whereby balance between AC power and DC power is lost, and difference power occurs. In accordance with occurrence of the difference power, the DC capacitor 34 in each converter cell 10 is to be charged and discharged.

In this case, in the DC current control unit 22, on the basis of information about the detected capacitor voltage Vcap of each DC capacitor 34, when the magnitude of the composite voltage ΣVcap obtained by combining (adding or averaging) the capacitor voltages of all the converter cells 10 for each phase exceeds a first predetermined value ΔVmax set in advance or becomes smaller than a second predetermined value ΔVmin (<ΔVmax) set in advance, the function of limiting the DC current control unit 22 to cause its output to be zero is released to allow the feedback control in the DC current control unit 22 to work.

That is, in the feedback control, as in embodiment 2, the DC current control unit 22 performs correction to subtract or add the DC current excessive component Δidc from or to the DC current command value idcref as a control target value for DC current, in accordance with the case where the DC current idc has such a polarity that indicates power flowing from the power converter 1 to the DC power supply 16, or the case where the DC current idc has such a polarity that indicates power flowing from the DC power supply 16 to the power converter 1.

Then, the DC current control unit 22 performs feedback control so that the detected DC current idc coincides with the corrected DC current command value (idcref−Δidc) or (idcref+Δidc), thereby generating and outputting a partial component of the DC voltage command Vdc* so as to control the DC voltage Vdc between the DC buses 2 and 3.

Thereafter, when a deviation between the corrected DC current command value (idcref−Δidc) or (idcref+Δidc) and the detected DC current idc becomes equal to or smaller than a predetermined value, the correction is stopped, and the DC current control unit 22 is operated so that the output of the DC current control unit 22 is limited to zero again.

As described above, in the process in which the output of the DC current control unit 22 is limited to zero again, it is desirable that the output of the DC current control unit 22 is gradually changed with elapse of time, that is, the DC voltage component Vdc* for the first voltage command Vp+ and the second voltage command Vp− gradually changes.

In the present embodiment 3, operations of the DC voltage control unit 21, the current control unit 25, and the PWM control unit 27 are the same as those in embodiment 1, and operations of the capacitor voltage control unit 24 and the DC current calculation unit 28 are the same as those in embodiment 2. Therefore, the detailed description thereof is omitted.

As described above, in the present embodiment 3, in accordance with variation in ΣVcap obtained by combining (adding or averaging) the capacitor voltages of all the converter cells 10, the DC voltage command value Vdcref of the DC voltage control unit 21 is controlled to decrease the magnitude of DC power as in embodiment 1, and in addition, in the DC current control unit 22, the DC current command value idcref as a control target value for DC current is corrected by the DC current excessive component Δidc. Thus, even in the AC-DC conversion terminal that mainly controls the DC voltage, balance between AC power and DC power can be kept and variation in the capacitor voltage Vcap of each converter cell 10 can be suppressed, whereby the operation can be continued without detecting the failure.

The present invention is not limited to only the configurations in the above embodiments 1 to 3. Without deviating from the gist of the present invention, the configurations in the above embodiments 1 to 3 may be partially modified or partially omitted, and further, the configurations in the above embodiments 1 to 3 may be combined with each other as appropriate.

The invention claimed is:

1. A DC power transmission power conversion device comprising:
    a power converter including a plurality of leg circuits composed of a positive arm and a negative arm for each phase which are connected in series to each other and have a connection point therebetween connected to an AC line for a corresponding phase, the leg circuits being connected in parallel between positive and negative DC buses, the power converter performing power conversion between plural-phase AC and DC; and
    a control device for controlling the power converter, wherein
    each of the positive arm and the negative arm composing each leg circuit is composed of at least one converter cell connected in series,
    the converter cell is composed of a series unit of a plurality of semiconductor switching elements connected in series, and a DC capacitor connected in parallel to the series unit,
    the control device performs output control for each converter cell composing the positive arm and the negative arm,
    the control device includes:
        a capacitor voltage control unit for generating a current command value (ipref, ip+ref, ip−ref) for voltage control for each DC capacitor on the basis of voltage (Vcap) of the DC capacitor;
        a current control unit for, on the basis of the current command value (ipref, ip+ref, ip−ref) from the capacitor voltage control unit, generating a voltage command (Vpc+, Vpc−) for AC current control, of a positive arm voltage command (Vp+) for controlling current flowing through the positive arm and a negative arm voltage command (Vp−) for controlling current flowing through the negative arm; and
        a DC control unit for, on the basis of DC voltage (Vdc) between the DC buses, DC current (idc) flowing through the DC buses, and a command value (Vdcref, idcref) as a preset control target value, generating a DC voltage command (Vdc*) for DC voltage control, of the positive arm voltage command (Vp+) and the negative arm voltage command (Vp−), and
    the control device corrects the command value (Vdcref or idcref) to be given to the DC control unit, in accordance with a detected amount of voltage variation in each DC capacitor.

2. The DC power transmission power conversion device according to claim 1, wherein
    the DC control unit includes a DC voltage control unit for generating a main component of the DC voltage command (Vdc*) on the basis of the voltage (Vdc) between the DC buses, composite voltage (ΣVcap) of the DC capacitors, and the command value (Vdcref), voltage variation in each DC capacitor is detected on the basis of a fact that the composite voltage (ΣVcap) of the DC capacitors exceeds a first predetermined value (ΔVmax) set in advance or becomes smaller than a second predetermined value (ΔVmin) set to be smaller than the first predetermined value (ΔVmax), and in response to the detection, the command value (Vdcref) set for the DC voltage control unit is corrected by adding thereto or subtracting therefrom a preset fixed value (ΔVdcref) in accordance with a polarity of the DC current (idc) or the command value (idcref) for DC current control.

3. The DC power transmission power conversion device according to claim 1, wherein the DC control unit includes a DC current control unit for generating a partial component of the DC voltage command (Vdc*) on the basis of the DC current (idc) flowing through the DC buses and the command value (idcref), voltage variation in each DC capacitor is detected on the basis of a fact that the current command value (ipref) generated by the capacitor voltage control unit exceeds a limiting value (iprefmax) set in advance for the capacitor voltage control unit, and in response to the detection, the command value (idcref) set for the DC current control unit is corrected on the basis of a DC current excessive component (Δidc) obtained by calculation using an excessive amount (Δip) with respect to the limiting value (iprefmax) for the current command value, AC voltage (Vp) for each phase, and the DC voltage (Vdc).

4. The DC power transmission power conversion device according to claim 1, wherein the DC control unit includes: a DC voltage control unit for generating a main component of the DC voltage command (Vdc*) on the basis of the voltage (Vdc) between the DC buses, composite voltage (ΣVcap) of the DC capacitors, and the command value (Vdcref); and a DC current control unit for generating a partial component of the DC voltage command (Vdc*) on the basis of the DC current (idc) flowing through the DC buses and the command value (idcref), voltage variation in each DC capacitor is detected on the basis of a fact that the composite voltage (ΣVcap) of the DC capacitors exceeds a first predetermined value (ΔVmax) set in advance or becomes smaller than a second predetermined value (ΔVmin) set to be smaller than the first predetermined value (ΔVmax), and in response to the detection, the command value (Vdcref) set for the DC voltage control unit is corrected by adding thereto or subtracting therefrom a preset fixed value (ΔVdcref) in accordance with a polarity of the DC current (idc) or the command value (idcref) for DC current control, and the command value (idcref) set for the DC current control unit is corrected on the basis of a DC current excessive component (Δidc) obtained by calculation using an excessive amount (Δip) with respect to the limiting value (iprefmax) for the current command value, AC voltage (Vp) for each phase, and the DC voltage (Vdc).

5. The DC power transmission power conversion device according to claim 2, wherein when it is detected that the composite voltage (ΣVcap) of the DC capacitors is not greater than the first predetermined value (ΔVmax) and not smaller than the second predetermined value (ΔVmin), correction for the command value (Vdcref) in the DC voltage control unit is stopped.

6. The DC power transmission power conversion device according to claim 3, wherein when it is detected that a magnitude of the DC current (idc) is not greater than a predetermined value, correction for the command value (idcref) in the DC current control unit is stopped.

7. The DC power transmission power conversion device according to claim 5, wherein the stop of correction for the command value (Vdcref) in the DC voltage control unit is performed such that the corrected command value is gradually changed to the command value before the correction.

8. The DC power transmission power conversion device according to claim 6, wherein the stop of correction for the command value (idcref) in the DC current control unit is performed such that the DC voltage component (Vdc*) of the positive arm voltage command (Vp$^+$) and the negative arm voltage command (Vp$^-$) is gradually changed.

9. A DC power transmission power conversion method, wherein a power converter is provided which includes a plurality of leg circuits composed of a positive arm and a negative arm for each phase which are connected in series to each other and have a connection point therebetween connected to an AC line for a corresponding phase, the leg circuits being connected in parallel between positive and negative DC buses, the power converter performing power conversion between plural-phase AC and DC, a control device for controlling the power converter is provided, each of the positive arm and the negative arm composing each leg circuit is composed of at least one converter cell connected in series, the converter cell is composed of a series unit of a plurality of semiconductor switching elements connected in series, and a DC capacitor connected in parallel to the series unit, and when performing output control for each converter cell composing the positive arm and the negative arm, the control device generates a current command value (ipref, ip$^+$ref, ip$^-$ref) for voltage control for each DC capacitor on the basis of voltage (Vcap) of the DC capacitor, on the basis of the current command value (ipref, ip$^+$ref, ip$^-$ref), generates a voltage command (Vpc$^+$, Vpc$^-$) for AC current control, of a positive arm voltage command (Vp$^+$) for controlling current flowing through the positive arm and a negative arm voltage command (Vp$^-$) for controlling current flowing through the negative arm, on the basis of DC voltage (Vdc) between the DC buses, DC current (idc) flowing through the DC buses, and a command value (Vdcref, idcref) as a preset control target value, generates a DC voltage command (Vdc*) for DC voltage control, of the positive arm voltage command (Vp$^+$) and the negative arm voltage command (Vp$^-$), and corrects the command value (Vdcref or idcref) in accordance with a detected amount of voltage variation in each DC capacitor.

10. The DC power transmission power conversion device according to claim 4, wherein when it is detected that the composite voltage (ΣVcap) of the DC capacitors is not greater than the first predetermined value (ΔVmax) and not smaller than the second predetermined value (ΔVmin), correction for the command value (Vdcref) in the DC voltage control unit is stopped.

11. The DC power transmission power conversion device according to claim 4, wherein
when it is detected that a magnitude of the DC current (idc) is not greater than a predetermined value, correction for the command value (idcref) in the DC current control unit is stopped.

12. The DC power transmission power conversion device according to claim 10, wherein
the stop of correction for the command value (Vdcref) in the DC voltage control unit is performed such that the corrected command value is gradually changed to the command value before the correction.

13. The DC power transmission power conversion device according to claim 11, wherein
the stop of correction for the command value (idcref) in the DC current control unit is performed such that the DC voltage component (Vdc*) of the positive arm voltage command (Vp$^+$) and the negative arm voltage command (Vp$^-$) is gradually changed.

* * * * *